US012695539B2

(12) United States Patent
 Salah et al.

(10) Patent No.: US 12,695,539 B2
(45) Date of Patent: Jul. 28, 2026

(54) PDCCH CCE AND BLIND DECODING PARTITIONING FOR CROSS-CARRIER ENHANCEMENT IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB); Jozsef Gabor Nemeth, Cambridge (GB)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 348 days.

(21) Appl. No.: 18/546,839

(22) PCT Filed: Feb. 22, 2022

(86) PCT No.: PCT/CN2022/077205
 § 371 (c)(1),
 (2) Date: Aug. 17, 2023

(87) PCT Pub. No.: WO2022/174836
 PCT Pub. Date: Aug. 25, 2022

(65) Prior Publication Data
 US 2024/0187129 A1     Jun. 6, 2024

Related U.S. Application Data

(60) Provisional application No. 63/200,208, filed on Feb. 22, 2021.

(51) Int. Cl.
 H04L 1/00      (2006.01)
 H04L 5/14      (2006.01)
 (Continued)

(52) U.S. Cl.
 CPC .......... H04L 1/0038 (2013.01); H04L 5/1469 (2013.01); H04W 72/232 (2023.01); H04W 72/51 (2023.01)

(58) Field of Classification Search
 CPC ... H04L 1/0038; H04L 5/1469; H04L 5/0053; H04L 5/001; H04W 72/232; H04W 72/51
 (Continued)

(56) References Cited

U.S. PATENT DOCUMENTS

| | | | |
|---|---|---|---|
| 11,166,275 B2 | 11/2021 | Lee et al. | |
| 2019/0223164 A1* | 7/2019 | He ...................... | H04W 76/27 |

(Continued)

FOREIGN PATENT DOCUMENTS

| | | |
|---|---|---|
| CN | 101772179 A | 7/2010 |
| CN | 111699654 A | 9/2020 |

(Continued)

OTHER PUBLICATIONS

Extended European Search Report dated Dec. 17, 2024, issued in application No. EP 22755609.9.

(Continued)

*Primary Examiner* — Obaidul Huq

(74) *Attorney, Agent, or Firm* — McClure, Qualey & Rodack, LLP

(57)      ABSTRACT

Various solutions for physical downlink control channel (PDCCH) control channel element (CCE) and blind decoding (BD) partitioning for cross-carrier enhancement in mobile communications are described. A user equipment (UE) adjusts either or both of a CCE budget and a BD budget to result in either or both of an adjusted CCE budget and an adjusted BD budget being allocated to a plurality of carriers. The UE performs PDCCH monitoring in the plurality of carriers using either or both of the adjusted CCE budget and the adjusted BD budget. The CCE budget includes an upper (Continued)

1100 ⟍

ADJUST EITHER OR BOTH OF A CONTROL CHANNEL ELEMENT (CCE) BUDGET AND A BLIND DECODING (BD) BUDGET TO RESULT IN EITHER OR BOTH OF AN ADJUSTED CCE BUDGET AND AN ADJUSTED BD BUDGET BEING ALLOCATED TO A PLURALITY OF CARRIERS
1110

PERFORM PHYSICAL DOWNLINK CONTROL CHANNEL (PDCCH) MONITORING IN THE PLURALITY OF CARRIERS USING EITHER OR BOTH OF THE ADJUSTED CCE BUDGET AND THE ADJUSTED BD BUDGET
1120 limit on a maximum number of CCEs that the UE is configured to perform per carrier of the plurality of carriers. The BD budget includes an upper limit on a maximum number of BDs that the UE is configured to perform.

19 Claims, 11 Drawing Sheets

(51) Int. Cl.
 *H04W 72/232* (2023.01)
 *H04W 72/51* (2023.01)
(58) Field of Classification Search
 USPC ......................................... 370/310, 328, 329
 See application file for complete search history.

(56) References Cited

U.S. PATENT DOCUMENTS

| | | | |
|---|---|---|---|
| 2019/0268206 A1* | 8/2019 | Yang | ....................... H04L 5/001 |
| 2020/0314678 A1 | 10/2020 | Lee | |
| 2021/0037502 A1 | 2/2021 | Tsai | |
| 2021/0119728 A1 | 4/2021 | Nunome | |
| 2021/0377996 A1* | 12/2021 | Lee | ....................... H04L 5/0044 |
| 2022/0053522 A1* | 2/2022 | MolavianJazi | ... H04W 72/0453 |
| 2023/0077644 A1* | 3/2023 | Shi | ......................... H04W 72/23 |
| | | | 370/329 |
| 2023/0199752 A1* | 6/2023 | Shi | ........................... H04L 5/001 |
| 2023/0397191 A1* | 12/2023 | Bagheri | ................. H04W 72/52 |

FOREIGN PATENT DOCUMENTS

| | | |
|---|---|---|
| CN | 112438059 A | 3/2021 |
| WO | 2019/217738 A1 | 11/2019 |
| WO | 2020/142705 A1 | 7/2020 |

OTHER PUBLICATIONS

CMCC; "Discussion on Remaining Issues for PDCCH and Search Space;" 3GPP TSG RAN WG1; Aug. 2018; pp. 1-5.

International Search Report dated 2022-05-20, issued in application No. PCT/CN2022/077205.

Panasonic; "Maintenance for physical downlink control channel;" 3GPP TSG RAN WG1 Meeting #94bis; R1-1811397; Oct. 2018; pp. 1-7.

VIVO; "Discussions on PDCCH monitoring enhancements for NR operation from 52.6GHz to 71GHz;" 3GPP TSG RAN WG1 #104-e; Jan. 2021; pp. 1-5.

\* cited by examiner

400

SCS = 30 kHz

EQUAL PARTITIONING OF CCE/BD BUDGETS

COMPONENT CARRIER (CC)

CC1 TDD (2,1)

| 56 CCEs, 36 BDs | 56 CCEs, 36 BDs | 112 CCEs, 72 BDs | | 56 CCEs, 36 BDs | |

CC2 TDD (3,1)

| 56 CCEs, 36 BDs | 56 CCEs, 36 BDs | 112 CCEs, 72 BDs | | 56 CCEs, 36 BDs | 112 CCEs, 72 BDs |

= DOWNLINK (DL)

= UPLINK (UL)

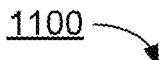

1100

ADJUST EITHER OR BOTH OF A CONTROL CHANNEL ELEMENT (CCE) BUDGET AND A BLIND DECODING (BD) BUDGET TO RESULT IN EITHER OR BOTH OF AN ADJUSTED CCE BUDGET AND AN ADJUSTED BD BUDGET BEING ALLOCATED TO A PLURALITY OF CARRIERS
1110

PERFORM PHYSICAL DOWNLINK CONTROL CHANNEL (PDCCH) MONITORING IN THE PLURALITY OF CARRIERS USING EITHER OR BOTH OF THE ADJUSTED CCE BUDGET AND THE ADJUSTED BD BUDGET
1120

FIG. 11

PDCCH CCE AND BLIND DECODING PARTITIONING FOR CROSS-CARRIER ENHANCEMENT IN MOBILE COMMUNICATIONS

CROSS REFERENCE TO RELATED PATENT APPLICATION(S)

The present disclosure is part of a non-provisional application claiming the priority benefit of U.S. Patent Application No. 63/200,208, filed 22 Feb. 2021, the content of which being incorporated by reference in its entirety.

TECHNICAL FIELD

The present disclosure is generally related to mobile communications and, more particularly, to physical downlink control channel (PDCCH) control channel element (CCE) and blind decoding (BD) partitioning for cross-carrier enhancement in mobile communications.

BACKGROUND

Unless otherwise indicated herein, approaches described in this section are not prior art to the claims listed below and are not admitted as prior art by inclusion in this section.

In wireless communications, such as mobile communications under the $3^{rd}$ Generation Partnership Project (3GPP) specification(s) for $5^{th}$ Generation (5G) New Radio (NR), downlink control information (DCI) is sent on PDCCH channels. For example, a PDCCH can be carried from a base station (e.g., gNB) to a user equipment (UE) by one, two, four, eight or sixteen CCEs to accommodate different DCI payload sizes or different coding rates. The values 1, 2, 4, 8 and 16 (corresponding to the one, two, four, eight or sixteen CCEs) are referred to as aggregation levels (ALs). Each CCE consists of six resource element groups (REGs), with each REG being constituted of twelve resource elements (REs) of one orthogonal frequency-division multiplexing (OFDM) symbol in one resource block (RB). Thus, CCEs are a set of time-frequency resources that the UE needs to monitor within control resource sets (CORESETs) to fetch control information. As CCE monitoring typically involves channel estimation by the UE for all the CCEs, it tends to contribute to UE complexity. To limit this complexity, a maximum total number of CCEs that the gNB could configure in one slot should not exceed specified values defined as an upper limit per carrier. These limits are herein referred to as CCE budgets.

With respect to BD, since the UE has no knowledge of the used aggregation levels and DCI sizes used in a particular PDCCH, the UE would try blindly all the possible combinations to decode the PDCCH. Similar to CCE monitoring, BD tends to involve a lot of computation on the part of UE in attempting to decode PDCCH, thereby contributing to UE complexity. Specified budgets have been defined in the 3GPP specifications as an upper limit on the maximum total number of BDs that a UE can perform. Such a limit is herein referred to as a BD budget. The BD budgets are selected to offer good trade-off between UE complexity and gNB scheduling flexibility. The UE computation effort, in terms of the number of BDs, usually depends on the number of AL candidates and the number of DCI sizes being monitored. In NR, 5 the UE needs to monitor up to four DCI sizes (including three cell radio network temporary identifiers (C-RNTIs) and one for other RNTIs) and up to eight candidates per AL.

Currently, the maximum CCEs and BD budgets have been defined per carrier in Release 15 (Rel-15) and Release 16 (Rel-16) of the 3GPP specification, the maximum CCEs and BD budgets (herein interchangeably denoted as $$C_{PDCCH}^{max,slot} \text{ and } M_{PDCCH}^{max,slot},$$

respectively) per slot have been defined in Rel-15, and the maximum CCEs and BD budgets per span have been defined in Rel-16 for subcarrier spacing (SCS) of 15 kHz and 30 kHz. When a UE supports carrier aggregation (CA), in case that the UE is configured with a number of cells $$N_{cells}^{DL} \le 4,$$

the UE is not required to monitor on one specific carrier more than the maximum CCE budget of $$C_{PDCCH}^{max,slot} CCEs$$

and the maximum BD budget of $$M_{PDCCH}^{max,slot} BDs.$$

Hence, the UE would monitor in total a maximum of $$N_{cells}^{DL} \times C_{PDCCH}^{max,slot}$$

CCEs and $$N_{cells}^{DL} \times M_{PDCCH}^{max,slot} BDs.$$

In case that the UE is configured with a number of cells $$N_{cells}^{DL} > 4,$$

the UE reports a UE capability of $$N_{cells}^{cap}$$

as the number of carriers that can be monitored, where $$4 \le N_{cells}^{cap} \le N_{cells}^{DL},$$

resulting in $$M_{PDCCH}^{totalslot,\mu} = \left\lfloor N_{cells}^{cap} \cdot M_{PDCCH}^{max,slot,\mu} \cdot N_{cells}^{DL,\mu} / \sum_{j=0}^{3} N_{cells}^{DL,j} \right\rfloor : \text{ and } C_{PDCCH}^{totalslot,\mu} =$$

-continued $$\left[ N_{cells}^{cap} \cdot C_{PDCCH}^{max,slot,\mu} \cdot N_{cells}^{DL,\mu} / \sum_{j=0}^{3} N_{cells}^{DL,j} \right].$$

Hence, the monitoring capabilities on the $$N_{cells}^{cap}$$

is scaled to all the configured cells. However, given four component carriers (CCs), the UE's capability is not fully utilized by monitoring up to $$3 \times C_{PDCCH}^{max,slot} CCEs$$

and $$3 \times M_{PDCCH}^{max,slot} BDs$$

when one of the four CCs is configured for uplink (UL) transmission, while the UE's hardware (HW) and software (SW) capabilities allow monitoring of up to $$4 \times C_{PDCCH}^{max,slot} CCEs \text{ and } 4 \times M_{PDCCH}^{max,slot} BDs.$$

Therefore, there is a need for a solution of PDCCH CCE/BD partitioning for cross-carrier enhancement in mobile communications in order to optimize utilization of UE capability.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions for PDCCH CCE/BD partitioning for cross-carrier enhancement in mobile communications. It is believed that various schemes proposed herein may further optimize usage of UE capability with respect to PDCCH CCE/BD partitioning on time-division duplexing (TDD) aggregated carriers. Moreover, increasing the numbers of CCEs and BDs monitored per carrier may increase the PDCCH reliability while reducing blockage probability.

In one aspect, a method may involve a UE adjusting either or both of a CCE budget and a BD budget to result in either or both of an adjusted CCE budget and an adjusted BD budget being allocated to a plurality of carriers. The CCE budget may refer to an upper limit on a maximum number of CCEs that the UE is configured to perform per carrier of the plurality of carriers. The BD budget may refer to an upper limit on a maximum number of BDs that the UE is configured to perform. The method may also involve the UE performing PDCCH monitoring in the plurality of carriers using either or both of the adjusted CCE budget and the adjusted BD budget.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-vehicle (V2V), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 11 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to PDCCH CCE/BD partitioning for cross-carrier enhancement in mobile communications. According to the present disclosure, a number of possible solutions may be implemented separately or jointly. That is, although these possible solutions may be described below separately, two or more of these possible solutions may be implemented in one combination or another.

Figure 1:
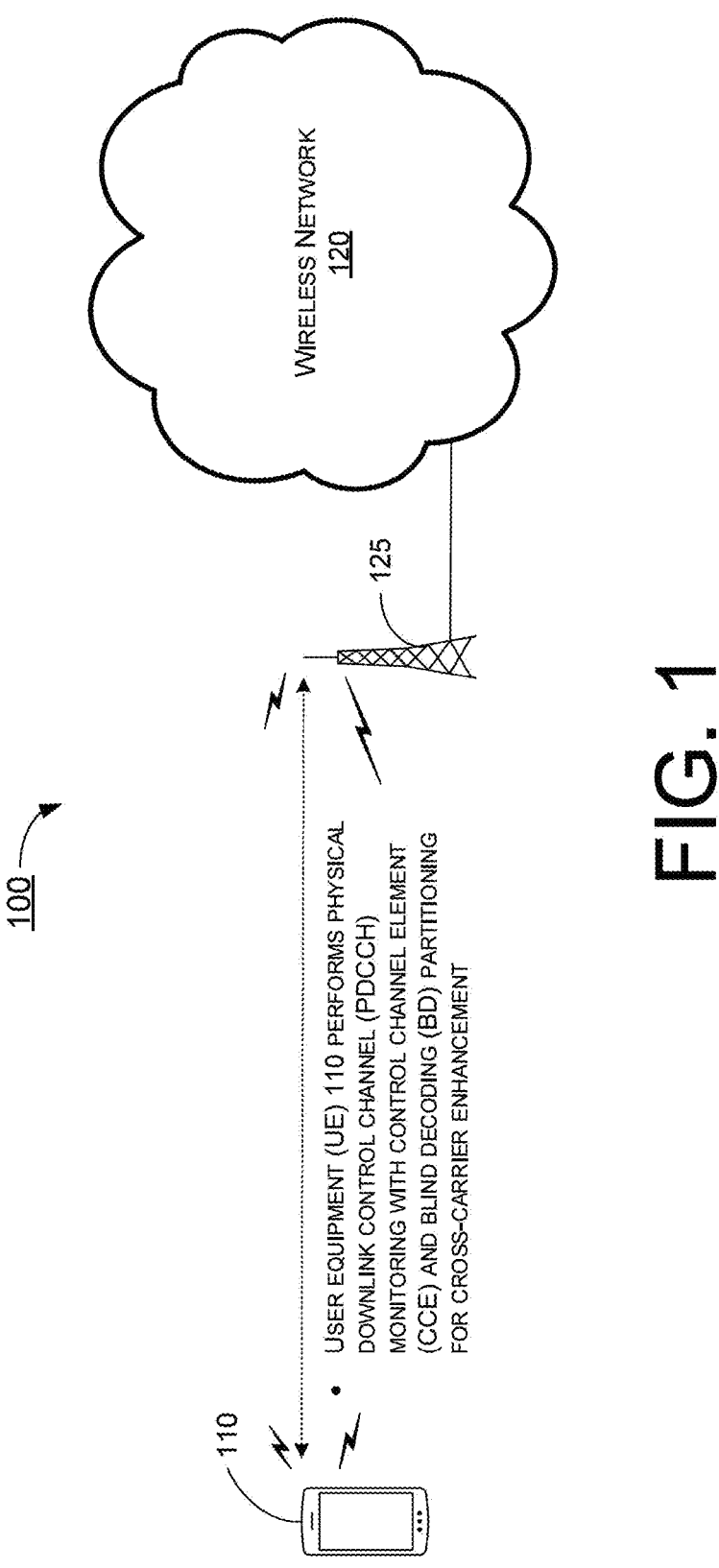
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. Referring to FIG. 1, network environment 100 may involve a user equipment (UE) 110 in wireless communication with a wireless network 120 (e.g., a 5G NR mobile network and/or another type of network such as a LTE network, a LTE-Advance network, a NB-IoT network, an IoT network, an IIoT network and/or an NTN). UE 110 may be in wireless communication with wireless network 120 via a base station or network node 125 (e.g., an eNB, gNB or transmit-receive point (TRP)). In network environment 100, UE 110 and wireless network 120 may implement various schemes pertaining to PDCCH CCE/BD partitioning for cross-carrier enhancement in mobile communications, as described below.

Figure 2:
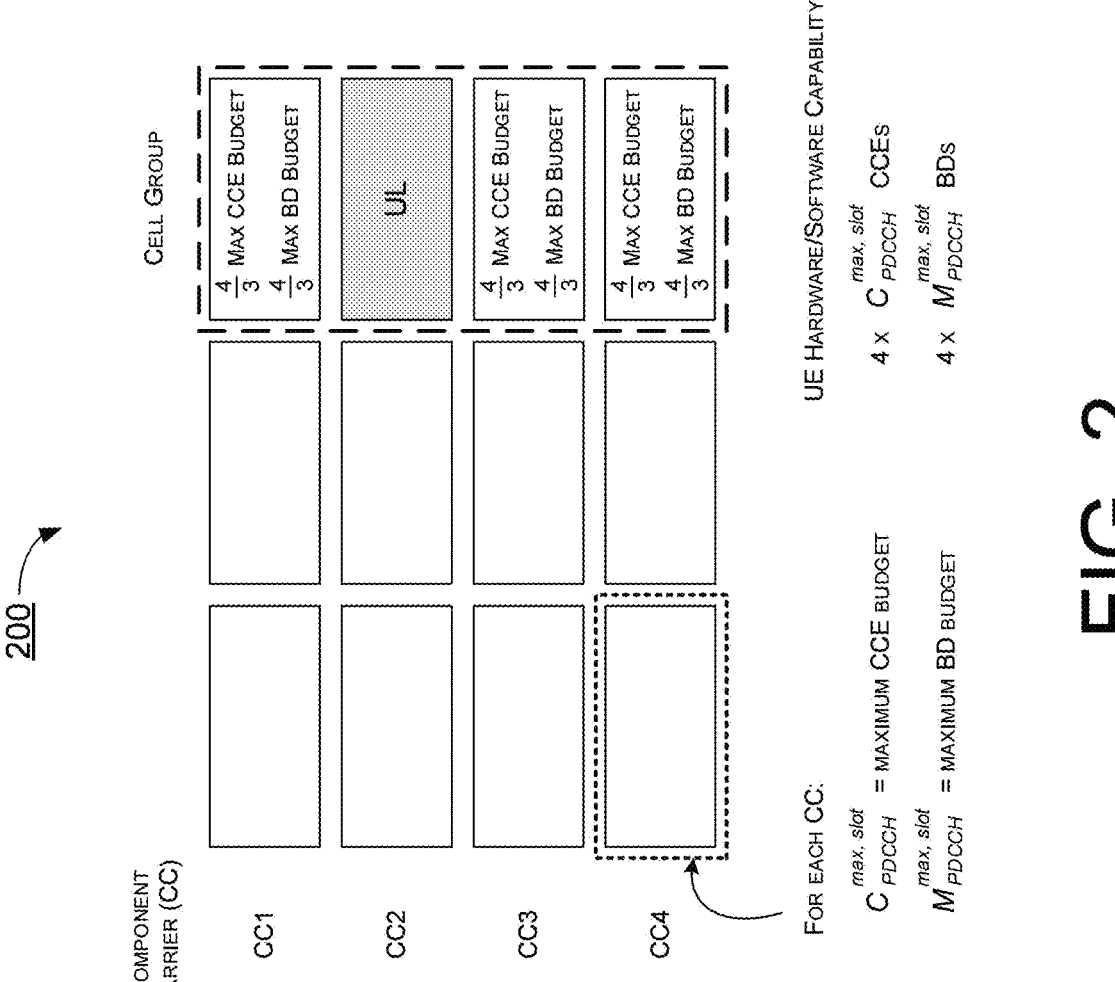
FIG. 2 is a diagram of an example scenario under a proposed scheme in accordance with the present disclosure.

FIG. 2 illustrates an example scenario 200 of PDCCH CCE/BD partitioning cross-carriers under a first proposed scheme in accordance with the present disclosure. Under the first proposed scheme, maximum CCE/BD budges (herein interchangeably referred to as CCE/BD budgets) may be re-scaled, whether equally/evenly or unevenly, for the remaining downlink (DL) carriers (e.g., on a specific slot). Alternatively, the CCE/BD budges may be re-scaled, whether equally/evenly or unevenly, between the carriers as needed. For instance, with bad channel conditions on one or more specific DL carriers, those specific DL carriers are not used for DL control and, rather, the CCE/BD budgets may be re-allocated to other carriers. For instance, among the four CCs in the cell group shown in scenario 200, one CC (e.g., CC2) is allocated for UL transmission. Accordingly, under the first proposed scheme, the CCE/BD budgets may be re-scaled such that each of CC1, CC3 and CC4 may be re-scaled with $$4/3 \times C_{PDCCH}^{max,slot}$$

CCEs and $$4/3 \times M_{PDCCH}^{max,slot}$$

BDs, respectively, for PDCCH monitoring to result in a total of $$4 \times C_{PDCCH}^{max,slot}$$

CCEs and $$4 \times M_{PDCCH}^{max,slot} BDs \left(as\ 4/3 \times 3 = 4\right)$$

for PDCCH monitoring for the cell group.

Under the first proposed scheme, there may be various approaches to how the CCE/BD budgets are re-scaled. For instance, re-scaling of the CCE/BD budgets may be defined as a UE capability and the support of which may be reported by UE 110 to network 120. Alternatively, or additionally, re-scaling of the CCE/BD budgets may be semi-statically (e.g., via radio resource control (RRC)) or dynamically (e.g., via DCI) enabled and/or disabled by network 120. Alternatively, or additionally, re-scaling of the CCE/BD budgets may be enabled and/or disabled per cell group or per group of carriers. Alternatively, or additionally, re-scaling of the CCE/BD budgets may be associated to the TDD patterns on different carriers. For instance, UE 110 may need to look at the TDD patterns at all or some carriers to decide about the re-scaling (e.g., if there are no uplink (UL) slots on some carriers then re-scaling is disabled or if there are some UL slots on some carriers then re-scaling is enabled). Alternatively, or additionally, re-scaling of the CCE/BD budgets may be enabled and/or disabled based on some implicit information (e.g., existence or lack of high-priority traffic). Alternatively, or additionally, re-scaling of the CCE/BD budgets may be enabled only when high-priority traffic is supported (e.g., within a given cell group) or in case that some specific DCI formats are configured for monitoring. Alternatively, or additionally, re-scaling of the monitoring budgets may be defined or otherwise specified for CCEs only or BDs only or separately enabled/disabled/configured for BDs and CCEs.

Figure 3:
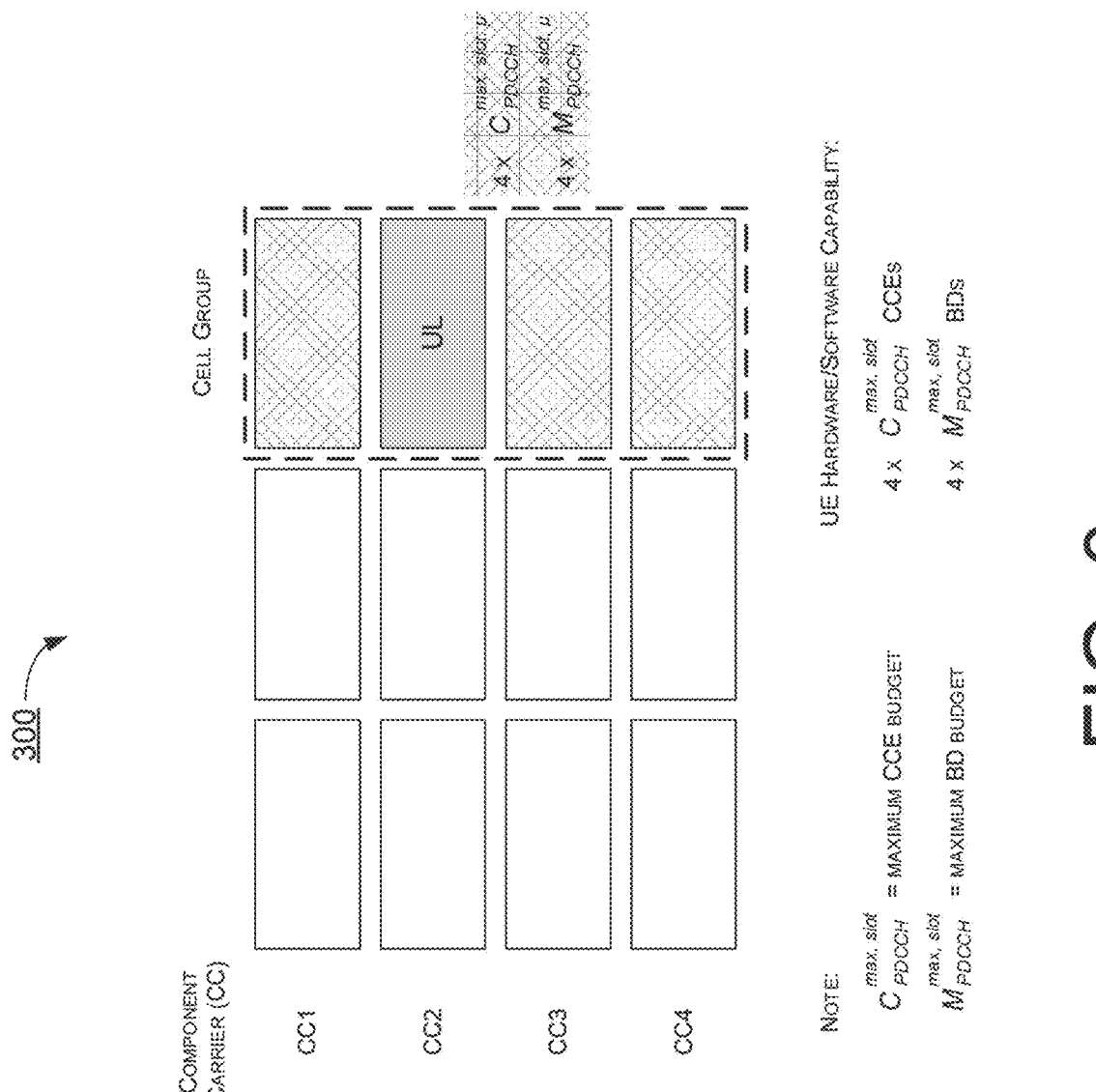
FIG. 3 is a diagram of an example scenario under a proposed scheme in accordance with the present disclosure.

FIG. 3 illustrates an example scenario 300 of PDCCH CCE/BD partitioning cross-carriers under a second proposed scheme in accordance with the present disclosure. Under the second proposed scheme, network 120 may have full flexibility to redistribute the CCEs and BDs on DL carriers (e.g., on a specific slot). For instance, some rules may be defined or otherwise specified to redistribute the CCEs/BDs on the DL carriers (e.g., on a specific slot).

Alternatively, or additionally, the minimum number of carriers on which the CCE/BD budgets are redistributed may be defined or otherwise specified or signaled by UE 110 to network 120 as a UE capability. For instance, among the four CCs in the cell group shown in scenario 300, one CC (e.g., CC2) is allocated for UL transmission. Accordingly, under the first proposed scheme, the CCE/BD budgets may be redistributed among CC1, CC3 and CC4 to result in a total of $$4 \times C_{PDCCH}^{max,slot}$$

CCEs and $$4 \times M_{PDCCH}^{max,slot}$$

BD for PDCCH monitoring for the cell group.

Under the second proposed scheme, the minimum number of carriers on which the CCE/BD budgets are redistributed may be defined separately for CCEs and BDs. In such cases, there may be two minimum numbers of carriers defined (one for CCEs and the other for BDs). Alternatively, or additionally, an upper limit may be defined for the CCEs/BDs per carrier after redistribution. For instance, redistribution may be enabled but an upper limit on the CCE/BD budgets after redistribution per carrier may be defined $$\left(\text{e.g., } 2C_{PDCCH}^{max,slot,\mu}, 2M_{PDCCH}^{max,slot,\mu}\right).$$

Figure 4:
FIG. 4 is a diagram of an example scenario under a proposed scheme in accordance with the present disclosure.

FIG. 4 illustrates an example scenario 400 in which various proposed schemes in accordance with the present disclosure may be implemented. Referring to FIG. 4, scenario 400 shows an example of equal or even partitioning of CCE/BD budgets, with SCS=30 kHz. In scenario 400, time-division duplexing (TDD) is utilized for each of CC1 and CC2. Moreover, for every three slots, CC1 has two slots allocated for DL and one slot allocated for UL (which is denoted as "CC1 TDD (2,1)" in FIG. 4). Furthermore, for every four slots, CC2 has three slots allocated for DL and one slot allocated for UL (which is denoted as "CC2 TDD (3,1)" in FIG. 4). With equal/even partitioning of CCE/BD budgets, each slot of CC1 and CC2 may be allocated with 56 CCEs and 36 BDs for PDCCH monitoring. For any slot in either CC1 or CC2 that is allocated for UL transmission, the corresponding slot in the other CC (e.g., CC1 or CC2) may be allocated 112 CCEs and 72 BDs to make up for what would have been allocated for the slot that is allocated for UL transmission.

Figure 5:
FIG. 5 is a diagram of an example scenario under a proposed scheme in accordance with the present disclosure.
Figure 5:
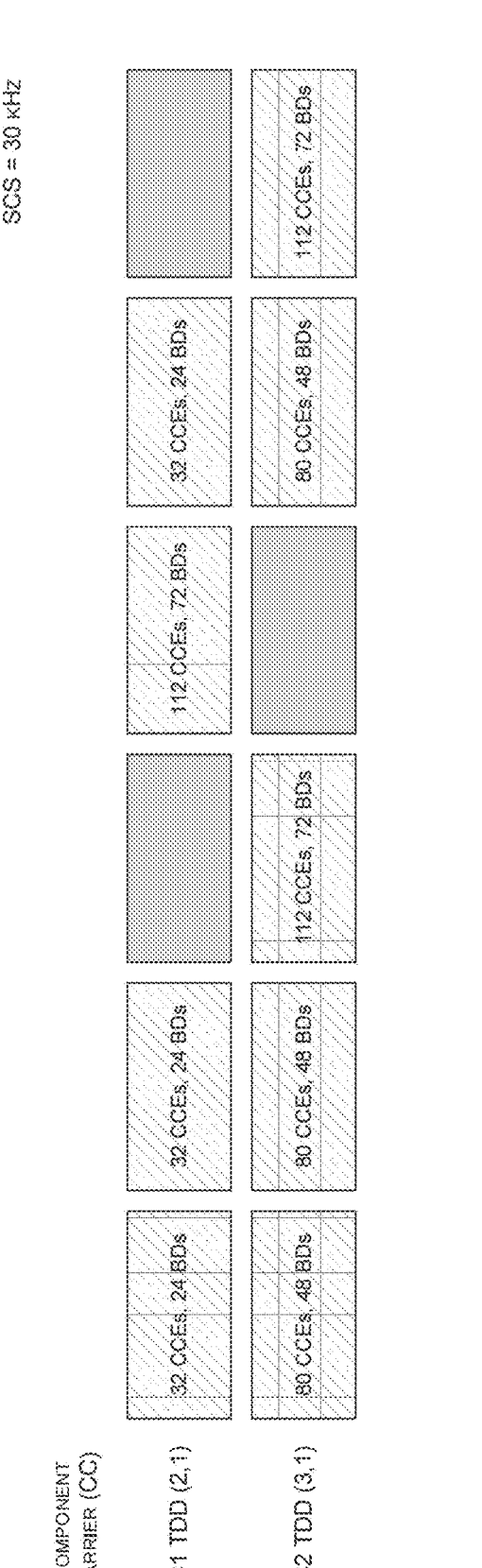

FIG. 5 illustrates an example scenario 500 in which various proposed schemes in accordance with the present disclosure may be implemented. Referring to FIG. 5, scenario 500 shows an example of uneven partitioning of CCE/BD budgets, with SCS=30 kHz. In scenario 500, ultra-reliable low-latency communication (URLLC) is mostly scheduled from PDCCH on CC2, hence larger CCE/BD budgets may be allocated for CC2. In scenario 500, TDD is utilized for each of CC1 and CC2. Moreover, for every three slots, CC1 has two slots allocated for DL and one slot allocated for UL (which is denoted as "CC1 TDD (2,1)" in FIG. 5). Furthermore, for every four slots, CC2 has three slots allocated for DL and one slot allocated for UL (which is denoted as "CC2 TDD (3,1)" in FIG. 5). With uneven partitioning of CCE/BD budgets, each slot of CC1 may be allocated with 32 CCEs and 24 BDs for PDCCH monitoring, and each slot of CC2 may be allocated with 80 CCEs and 48 BDs for PDCCH monitoring. For any slot in either CC1 or CC2 that is allocated for UL transmission, the corresponding slot in the other CC (e.g., CC1 or CC2) may be allocated 112 CCEs and 72 BDs to make up for what would have been allocated for the slot that is allocated for UL transmission.

Figure 6:
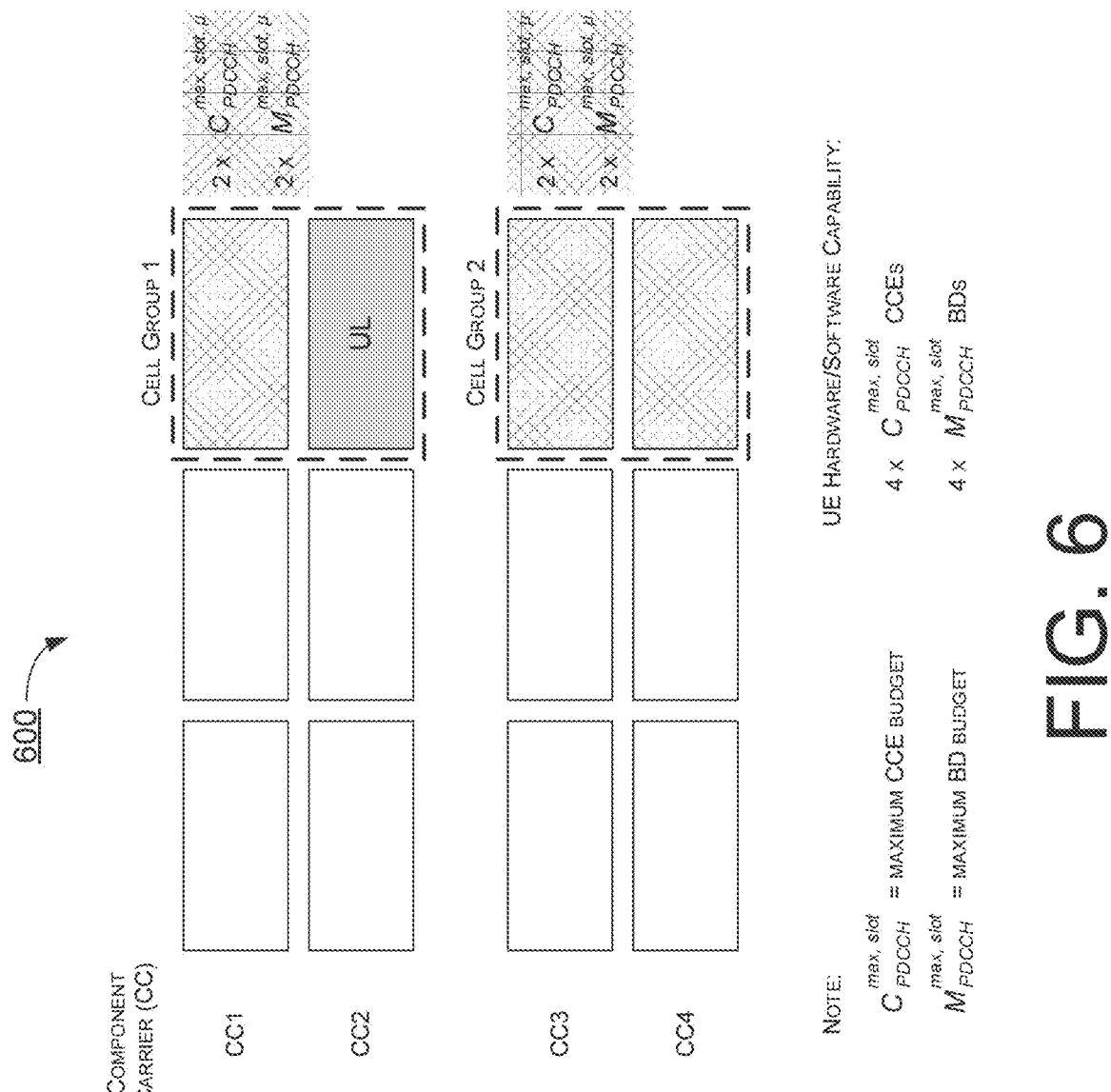
FIG. 6 is a diagram of an example scenario under a proposed scheme in accordance with the present disclosure.

FIG. 6 illustrates an example scenario 600 of PDCCH CCE/BD partitioning cross-carriers under a third proposed scheme in accordance with the present disclosure. Under the third proposed scheme, CCE/BD budgets may be defined per cell group. For instance, limits on different CCE/BD budgets may be defined per cell group and/or per carrier. Alternatively, or additionally, CCE/BD budgets per cell group may be enabled and/or disabled semi-statically (e.g., via RRC) or dynamically (e.g., via DCI). Alternatively, or additionally, CCE/BD budgets per cell group may be supported as a UE capability which UE 110 may indicate to network 120. For instance, among the four CCs shown in scenario 300, CC1 and CC2 may be in one cell group (cell group 1) while CC3 and CC4 may be in another cell group (cell group 2). Under the third proposed scheme, CCE/BD budgets may be defined such that each of cell group 1 and cell group 2 may be allocated $$2 \times C_{PDCCH}^{max,slot}$$

CCEs and $$2 \times M_{PDCCH}^{max,slot}$$

BDs to result in a total of $$4 \times C_{PDCCH}^{max,slot}$$

CCEs and $$4 \times M_{PDCCH}^{max,slot}$$

BDs for PDCCH monitoring for both cell groups.

Figure 7:
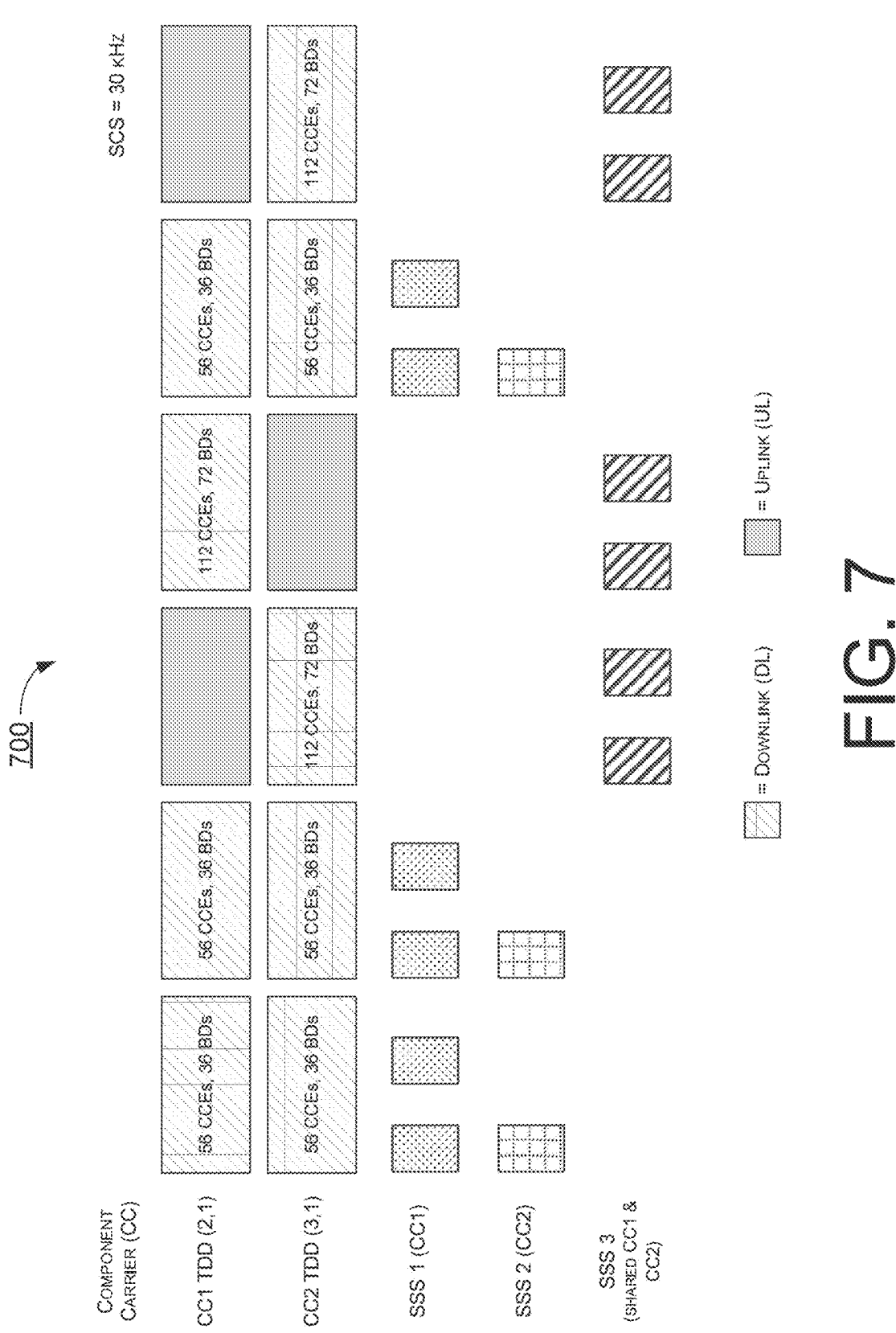
FIG. 7 is a diagram of an example scenario under a proposed scheme in accordance with the present disclosure.

FIG. 7 illustrates an example scenario 700 of PDCCH CCE/BD partitioning cross-carriers under a fourth proposed scheme in accordance with the present disclosure. Under the fourth proposed scheme, cross-carrier search space sets may be introduced. For instance, the search space sets may be defined per cell group. In scenario 700, network 120 may have the flexibility to allocate more PDCCH candidates and CCEs for search space set 3 (SSS 3). In scenario 700, TDD is utilized for each of CC1 and CC2. Moreover, for every three slots, CC1 has two slots allocated for DL and one slot allocated for UL (which is denoted as "CC1 TDD (2,1)" in FIG. 7). Furthermore, for every four slots, CC2 has three slots allocated for DL and one slot allocated for UL (which is denoted as "CC2 TDD (3,1)" in FIG. 7). In scenario 700, each slot of CC1 and CC2 may be allocated with 56 CCEs and 36 BDs for PDCCH monitoring. For any slot in either CC1 or CC2 that is allocated for UL transmission, the corresponding slot in the other CC (e.g., CC1 or CC2) may be allocated 112 CCEs and 72 BDs to make up for what would have been allocated for the slot that is allocated for UL transmission. Moreover, in scenario 700, search space set 1 (SSS 1) may be utilized for CC1 and search space set 2 (SSS 2) may be utilized for CC2, while SSS 3 may be utilized for both CC1 and CC2.

Under the fourth proposed scheme, extra CCEs/BDs for cross-carrier search space may be used to configure more ALs to monitor and/or to support a larger number of candidates per AL, thereby achieving better reliability and reduced blockage probability. Moreover, a larger number of DCI sizes may be supported (e.g., all DCI sizes from all carriers scheduled on the same carrier). Alternatively, or additionally, cross-carrier CORESET may be defined. For instance, to enable cross-carrier SSS, UE 110 may be configured with the following: CORESET-1 on CC1, CORESET-2 on CC2, and CORESET-3 on both CC1 and CC2. Alternatively, or additionally, more than one CORE-SET may be linked to a cross-carrier SSS. For instance, cross-carrier SSS (e.g., SSS-3 in FIG. 7) may utilize CORE-SET-1 when UE 110 monitors on CC1 and CORESET-2 when UE 110 monitors on CC2.

Alternatively, or additionally, the group of carriers associated to the SSS may be included in the search space configuration. Alternatively, or additionally, new aggregation levels may be specifically defined to be used with the cross-carrier SSS. Alternatively, or additionally, new nrofCandidates (information specifying the number of PDCCH candidates) may be defined or otherwise specified for the cross-carrier SSS. Alternatively, or additionally, UE 110 may report its support of the new aggregation levels and the new nrofCandidates to network 120. Alternatively, or additionally, a common search space set (type-1, type-2 or type-3) may or may not be allowed on cross-carrier search space sets. For example, a cross-carrier SSS may be allowed only for UE-specific SSS. As another example, a cross-carrier SSS may be allowed for both UE-specific SSS and common SSS. As yet another example, a cross-carrier SSS may be enabled and/or disabled separately for UE-specific SSS and/or common SSS.

Figure 8:
FIG. 8 is a diagram of an example scenario under a proposed scheme in accordance with the present disclosure.

FIG. 8 illustrates an example scenario 800 of PDCCH CCE/BD partitioning cross-carriers under a fifth proposed scheme in accordance with the present disclosure. Under the fifth proposed scheme, a larger number of DCI sizes may be utilized for cross-carrier search space. In scenario 800, TDD is utilized for each of CC1 and CC2. Moreover, for every three slots, CC1 has two slots allocated for DL and one slot allocated for UL (which is denoted as "CC1 TDD (2,1)" in FIG. 8). Furthermore, for every four slots, CC2 has three slots allocated for DL and one slot allocated for UL (which is denoted as "CC2 TDD (3,1)" in FIG. 8). In scenario 800, each slot of CC1 and CC2 may be allocated with 3+1 DCI sizes with respect to PDCCH monitoring. For any slot in either CC1 or CC2 that is allocated for UL transmission, the corresponding slot in the other CC (e.g., CC1 or CC2) may be allocated with 6+2 DCI sizes to make up for what would have been allocated for the slot that is allocated for UL transmission. Moreover, in scenario 800, SSS 1 may be utilized for CC1 and SSS 2 may be utilized for CC2, while SSS 3 may be utilized for both CC1 and CC2.

Figure 9:
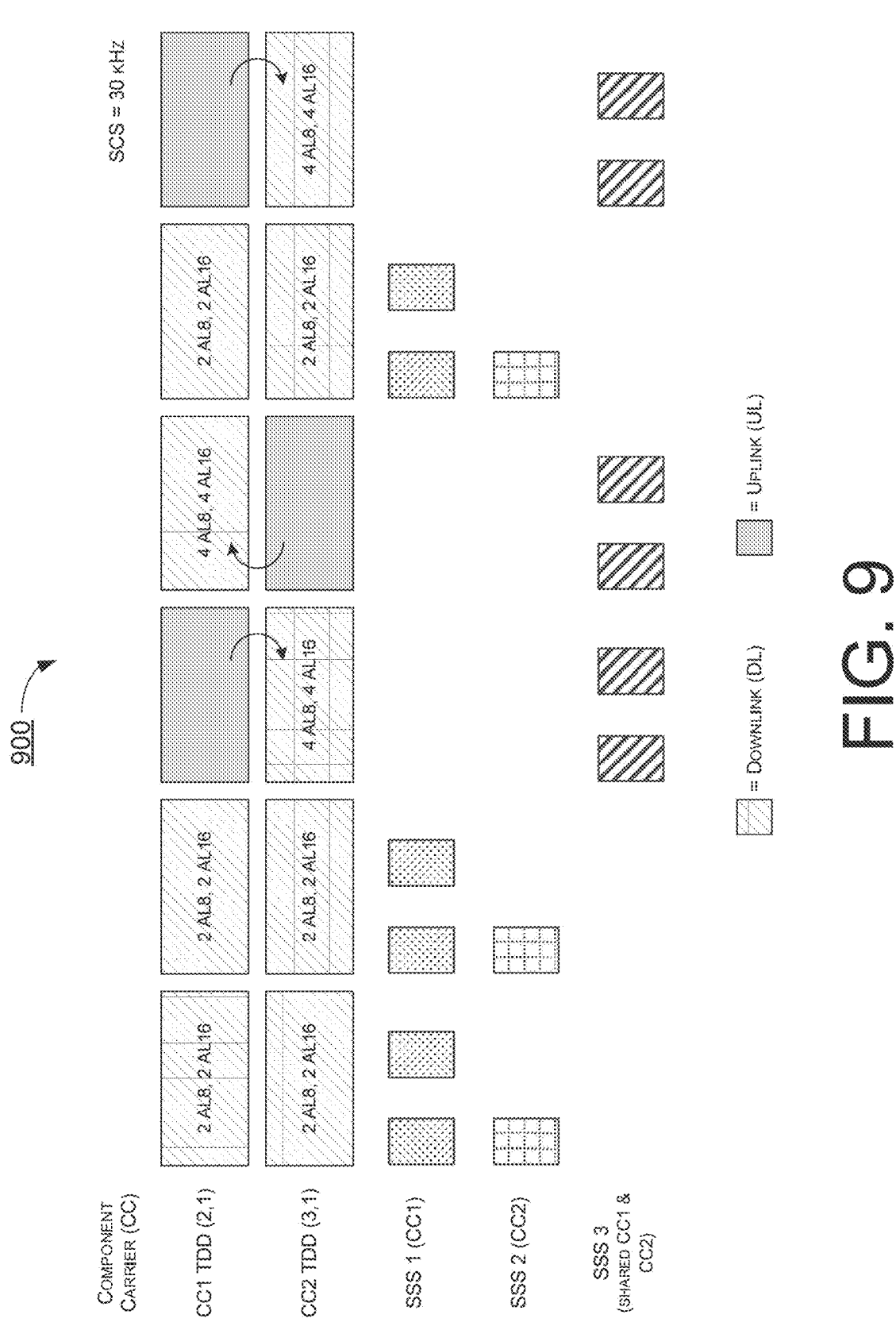
FIG. 9 is a diagram of an example scenario under a proposed scheme in accordance with the present disclosure.

Under the fifth proposed scheme, DCI size budget may be linked to the search space. FIG. 9 illustrates an example scenario 900 of PDCCH CCE/BD partitioning cross-carriers under the fifth proposed scheme. Under the fifth proposed scheme, a larger number of candidates per AL may be utilized. In scenario 900, TDD is utilized for each of CC1 and CC2. Moreover, for every three slots, CC1 has two slots allocated for DL and one slot allocated for UL (which is denoted as "CC1 TDD (2,1)" in FIG. 9). Furthermore, for every four slots, CC2 has three slots allocated for DL and one slot allocated for UL (which is denoted as "CC2 TDD (3,1)" in FIG. 9). In scenario 900, each slot of CC1 and CC2 may be allocated with two AL8 and two AL16 (2 AL8, 2 AL16) with respect to PDCCH monitoring. For any slot in either CC1 or CC2 that is allocated for UL transmission, the corresponding slot in the other CC (e.g., CC1 or CC2) may be allocated with four AL8 and four AL16 (4 AL8, 4 AL16) to make up for what would have been allocated for the slot that is allocated for UL transmission. Moreover, in scenario 800, SSS 1 may be utilized for CC1 and SSS 2 may be utilized for CC2, while SSS 3 may be utilized for both CC1 and CC2.

Illustrative Implementations

Figure 10:
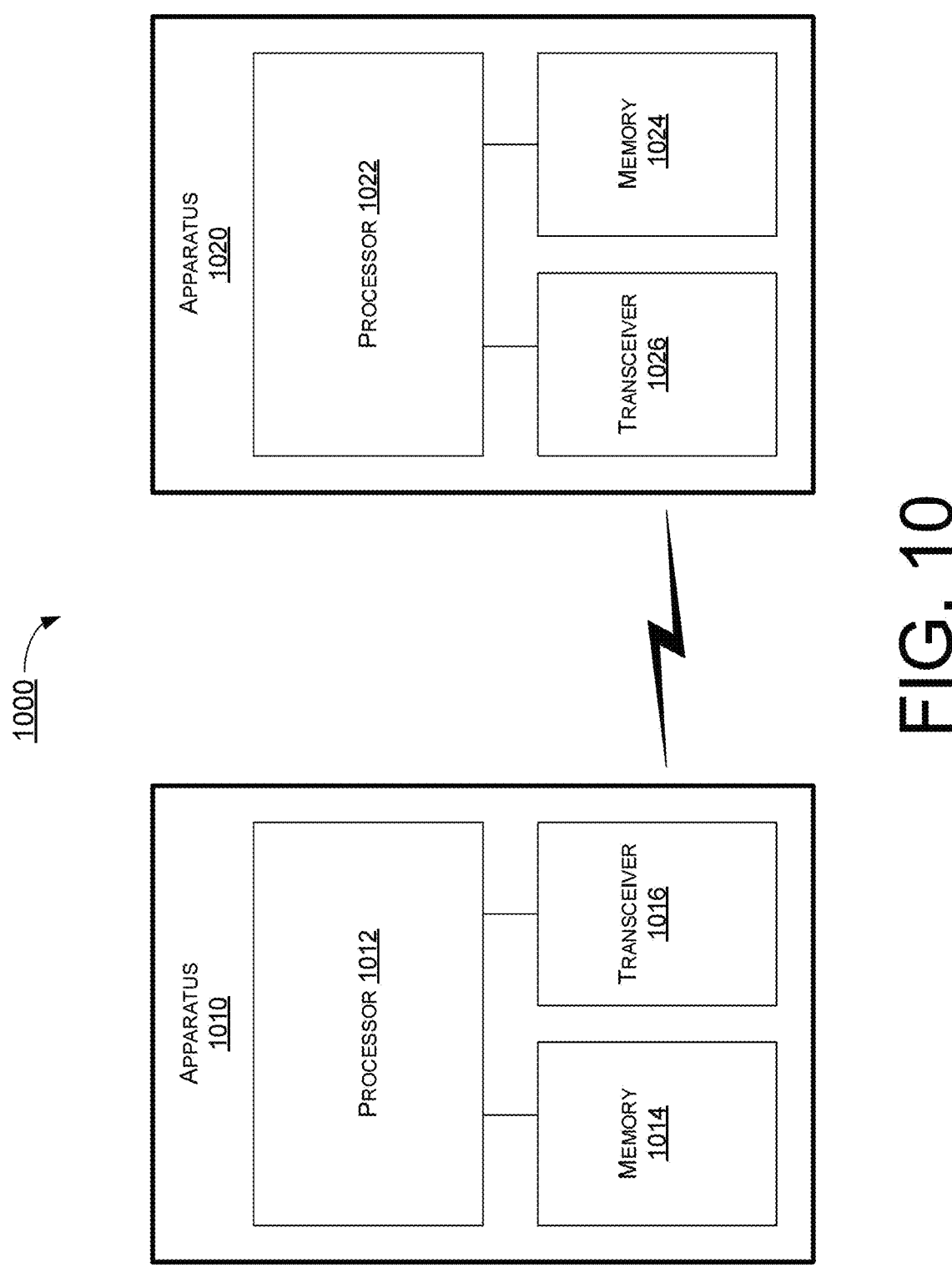
FIG. 10 is a block diagram of an example communication system in accordance with an implementation of the present disclosure.

FIG. 10 illustrates an example communication system 1000 having a communication apparatus 1010 and a network apparatus 1020 in accordance with an implementation of the present disclosure. Each of communication apparatus 1010 and network apparatus 1020 may perform various functions to implement schemes, techniques, processes and methods described herein pertaining to PDCCH CCE/BD partitioning for cross-carrier enhancement in mobile communications, including scenarios/schemes described above as well as processes described below.

Communication apparatus 1010 may be a part of an electronic apparatus, which may be a UE such as a portable or mobile apparatus, a wearable apparatus, a wireless communication apparatus or a computing apparatus. For instance, communication apparatus 1010 may be implemented in a smartphone, a smartwatch, a personal digital assistant, a digital camera, or a computing equipment such as a tablet computer, a laptop computer or a notebook computer. Communication apparatus 1010 may also be a part of a machine type apparatus, which may be an IoT, NB-IoT, IIoT or NTN apparatus such as an immobile or a stationary apparatus, a home apparatus, a wire communication apparatus or a computing apparatus. For instance, communication apparatus 1010 may be implemented in a smart thermostat, a smart fridge, a smart door lock, a wireless speaker or a home control center. Alternatively, communication apparatus 1010 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 1010 may include at least some of those components shown in FIG. 10 such as a processor 1012, for example. Communication apparatus 1010 may further include one or more other components not pertinent to the proposed scheme of the present disclosure (e.g., internal power supply, display device and/or user interface device), and, thus, such component(s) of communication apparatus 1010 are neither shown in FIG. 10 nor described below in the interest of simplicity and brevity.

Network apparatus 1020 may be a part of an electronic apparatus/station, which may be a network node such as a base station, a small cell, a router, a gateway or a satellite. For instance, network apparatus 1020 may be implemented in an eNodeB in an LTE, in a gNB in a 10G, NR, IoT, NB-IoT, IIoT, or in a satellite in an NTN network. Alternatively, network apparatus 1020 may be implemented in the form of one or more IC chips such as, for example and without limitation, one or more single-core processors, one or more multi-core processors, or one or more RISC or CISC processors. Network apparatus 1020 may include at least some of those components shown in FIG. 10 such as a processor 1022, for example. Network apparatus 1020 may further include one or more other components not pertinent to the proposed scheme of the present disclosure (e.g., internal power supply, display device and/or user interface device), and, thus, such component(s) of network apparatus 1020 are neither shown in FIG. 10 nor described below in the interest of simplicity and brevity.

In one aspect, each of processor 1012 and processor 1022 may be implemented in the form of one or more single-core processors, one or more multi-core processors, one or more RISC processors, or one or more CISC processors. That is, even though a singular term "a processor" is used herein to refer to processor 1012 and processor 1022, each of processor 1012 and processor 1022 may include multiple processors in some implementations and a single processor in other implementations in accordance with the present disclosure. In another aspect, each of processor 1012 and processor 1022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1012 and processor 1022 is a special-purpose machine specifically designed, arranged and configured to perform specific tasks including PDCCH CCE/BD partitioning for cross-carrier enhancement in mobile communications in accordance with various implementations of the present disclosure.

In some implementations, communication apparatus 1010 may also include a transceiver 1016 coupled to processor 1012 and capable of wirelessly transmitting and receiving data. In some implementations, communication apparatus 1010 may further include a memory 1014 coupled to processor 1012 and capable of being accessed by processor 1012 and storing data therein. In some implementations, network apparatus 1020 may also include a transceiver 1026 coupled to processor 1022 and capable of wirelessly transmitting and receiving data. In some implementations, network apparatus 1020 may further include a memory 1024 coupled to processor 1022 and capable of being accessed by processor 1022 and storing data therein. Accordingly, communication apparatus 1010 and network apparatus 1020 may wirelessly communicate with each other via transceiver 1016 and transceiver 1026, respectively.

Each of communication apparatus 1010 and network apparatus 1020 may be a communication entity capable of communicating with each other using various proposed schemes in accordance with the present disclosure. To aid better understanding, the following description of the operations, functionalities and capabilities of each of communication apparatus 1010 and network apparatus 1020 is provided in the context of a mobile communication environment in which communication apparatus 1010 is implemented in or as a communication apparatus or a UE (e.g., UE 110) and network apparatus 1020 is implemented in or as a network node or base station (e.g., network node 125) of a communication network (e.g., wireless network 120). It is also noteworthy that, although the example implementations described below are provided in the context of mobile communications, the same may be implemented in other types of networks.

Under various proposed schemes pertaining to PDCCH CCE/BD partitioning for cross-carrier enhancement in mobile communications in accordance with the present disclosure, with communication apparatus 1010 implemented in or as UE 110 and network apparatus 1020 implemented in or as network node 125 in network environment 100, processor 1012 of communication apparatus 1010 may adjust either or both of a CCE budget and a BD budget to result in either or both of an adjusted CCE budget and an adjusted BD budget being allocated to a plurality of carriers. The CCE budget refers to an upper limit on a maximum number of CCEs that UE 110 is configured to perform per carrier of the plurality of carriers. The BD budget refers to an upper limit on a maximum number of BDs that UE 110 is configured to perform. Moreover, processor 1012 may perform, via transceiver 1016, PDCC monitoring in the plurality of carriers using either or both of the adjusted CCE budget and the adjusted BD budget.

In some implementations, in adjusting either or both of the CCE budget and the BD budget, processor 1012 may redistribute either or both of the CCE budget and the BD budget evenly or unevenly among one or more DL carriers of the plurality of carriers. In some implementations, a minimum number of carriers on which the CCE budget or the BD budget may be redistributed is predefined or reported as a UE capability. In some implementations, a respective upper limit may be defined for CCEs and BDs per carrier after the redistributing.

In some implementations, in adjusting either or both of the CCE budget and the BD budget, processor 1012 may re-scale either or both of the CCE budget and the BD budget as a UE capability. Additionally, processor 1012 may report support of the UE capability to a network (e.g., network 120 via apparatus 1020 as network node 125). In some implementations, the re-scaling of either or both of the CCE budget and the BD budget may be enabled or disabled per cell group or per group of carriers of the plurality of carriers. Alternatively, or additionally, the re-scaling of either or both of the CCE budget and the BD budget may be associated to TDD patterns on different carriers of the plurality of carriers. Alternatively, or additionally, the re-scaling of either or both of the CCE budget and the BD budget may be enabled or disabled based on whether or not there is high-priority traffic. Alternatively, or additionally, the re-scaling of either or both of the CCE budget and the BD budget may be enabled in an event that high-priority traffic is supported or a specific DCI format is configured for monitoring. Alternatively, or additionally, the re-scaling may apply to either CCEs or BDs but not both and is separately enabled, disabled or configured for CCEs and BDs.

In some implementations, in adjusting either or both of the CCE budget and the BD budget, processor 1012 may re-scale either or both of the CCE budget either semi-statically by a RRC signal from a network (e.g., network 120 via apparatus 1020 as network node 125) or dynamically by a DCI signal from the network.

In some implementations, each of the CCE budget and the BD budget may be defined per cell group. Moreover, different limits on the CCE budget and the BD budget may be defined per cell group or per carrier. Furthermore, each of the CCE budget and the BD budget per cell group may be supported as a UE capability which may be enabled or disabled either semi-statically by a RRC signal from a network (e.g., network 120 via apparatus 1020 as network node 125) or dynamically by a DCI signal from the network.

In some implementations, in performing the PDCCH monitoring, processor 1012 may perform the PDCCH monitoring with extra CCEs or BDs, or both, in cross-carrier search space sets with one or more of: (a) additional ALs, (b) a greater number of candidates per AL, and (c) a greater number of DCI sizes.

In some implementations, in performing the PDCCH monitoring, processor 1012 may perform the PDCCH monitoring with CORESETs such that: (a) a first CORESET is on a first carrier of the plurality of carriers; (b) a second CORESET is on a second carrier of the plurality of carriers; and (c) both the first CORESET and the second CORESET are on a third carrier of the plurality of carriers.

In some implementations, in performing the PDCCH monitoring, processor 1012 may perform the PDCCH monitoring with multiple CORESETs linked to one cross-carrier search space set.

In some implementations, in performing the PDCCH monitoring, processor 1012 may perform the PDCCH monitoring with a search space set. In such cases, a group of carriers of the plurality of carriers that is associated to the search space set may be included in a search space configuration.

In some implementations, in performing the PDCCH monitoring, processor 1012 may perform the PDCCH monitoring with new ALs defined for use in a cross-carrier search space set. In such cases, support of the new ALs may be a UE capability reported to a network (e.g., network 120 via apparatus 1020 as network node 125).

In some implementations, in performing the PDCCH monitoring, processor 1012 may perform the PDCCH monitoring with new information specifying a number of PDCCH candidates defined for a cross-carrier search space set. In such cases, support of the new information may be a UE capability reported to a network (e.g., network 120 via apparatus 1020 as network node 125).

In some implementations, in performing the PDCCH monitoring, processor 1012 may perform the PDCCH monitoring with a common search space set either allowed or not allowed for a cross-carrier search space set such that: (a) the cross-carrier search space set is for a UE-specific search space set; or (b) the cross-carrier search space set is allowed for both the UE-specific search space set and the common search space set; or (c) the cross-carrier search space set is enabled or disabled separately for the UE-specific search space set and the common search space set.

Illustrative Processes

FIG. 11 illustrates an example process 1100 in accordance with an implementation of the present disclosure. Process 1100 may be an example implementation of schemes described above whether partially or completely, with respect to PDCCH CCE/BD partitioning for cross-carrier enhancement in mobile communications in accordance with the present disclosure. Process 1100 may represent an aspect of implementation of features of communication apparatus 1010 and network apparatus 1020. Process 1100 may include one or more operations, actions, or functions as illustrated by one or more of blocks 1110 and 1120. Although illustrated as discrete blocks, various blocks of process 1100 may be divided into additional blocks, combined into fewer blocks, or eliminated, depending on the desired implementation. Moreover, the blocks of process 1100 may executed in the order shown in FIG. 11 or, alternatively, in a different order. Process 1100 may be implemented by communication apparatus 1010 or any suitable UE or machine type devices as well as by and network apparatus 1020 or any suitable network node or base station. Solely for illustrative purposes and without limitation, process 1100 is described below in the context of communication apparatus 1010 implemented in or as UE 110 and network apparatus 1020 implemented in or as network node 125. Process 1100 may begin at block 1110.

At 1110, process 1100 may involve processor 1012 of communication apparatus 1010, implemented in or as UE 110, adjusting either or both of a CCE budget and a BD budget to result in either or both of an adjusted CCE budget and an adjusted BD budget being allocated to a plurality of carriers. The CCE budget refers to an upper limit on a maximum number of CCEs that UE 110 is configured to perform per carrier of the plurality of carriers. The BD budget refers to an upper limit on a maximum number of BDs that UE 110 is configured to perform. Process 1100 may proceed from 1110 to 1120.

At 1120, process 1100 may involve processor 1012 performing, via transceiver 1016, PDCC monitoring in the plurality of carriers using either or both of the adjusted CCE budget and the adjusted BD budget.

In some implementations, in adjusting either or both of the CCE budget and the BD budget, process 1100 may involve processor 1012 redistributing either or both of the CCE budget and the BD budget evenly or unevenly among one or more DL carriers of the plurality of carriers. In some implementations, a minimum number of carriers on which the CCE budget or the BD budget may be redistributed is predefined or reported as a UE capability. In some implementations, a respective upper limit may be defined for CCEs and BDs per carrier after the redistributing.

In some implementations, in adjusting either or both of the CCE budget and the BD budget, process 1100 may involve processor 1012 re-scaling either or both of the CCE budget and the BD budget as a UE capability. Additionally, process 1100 may involve processor 1012 reporting support of the UE capability to a network (e.g., network 120 via apparatus 1020 as network node 125). In some implementations, the re-scaling of either or both of the CCE budget and the BD budget may be enabled or disabled per cell group or per group of carriers of the plurality of carriers. Alternatively, or additionally, the re-scaling of either or both of the CCE budget and the BD budget may be associated to TDD patterns on different carriers of the plurality of carriers. Alternatively, or additionally, the re-scaling of either or both of the CCE budget and the BD budget may be enabled or disabled based on whether or not there is high-priority traffic. Alternatively, or additionally, the re-scaling of either or both of the CCE budget and the BD budget may be enabled in an event that high-priority traffic is supported or a specific DCI format is configured for monitoring. Alternatively, or additionally, the re-scaling may apply to either CCEs or BDs but not both and is separately enabled, disabled or configured for CCEs and BDs.

In some implementations, in adjusting either or both of the CCE budget and the BD budget, process 1100 may involve processor 1012 re-scaling either or both of the CCE budget either semi-statically by a RRC signal from a network (e.g., network 120 via apparatus 1020 as network node 125) or dynamically by a DCI signal from the network.

In some implementations, each of the CCE budget and the BD budget may be defined per cell group. Moreover, different limits on the CCE budget and the BD budget may be defined per cell group or per carrier. Furthermore, each of the CCE budget and the BD budget per cell group may be supported as a UE capability which may be enabled or disabled either semi-statically by a RRC signal from a network (e.g., network 120 via apparatus 1020 as network node 125) or dynamically by a DCI signal from the network.

In some implementations, in performing the PDCCH monitoring, process 1100 may involve processor 1012 performing the PDCCH monitoring with extra CCEs or BDs, or both, in cross-carrier search space sets with one or more of: (a) additional ALs, (b) a greater number of candidates per AL, and (c) a greater number of DCI sizes.

In some implementations, in performing the PDCCH monitoring, process 1100 may involve processor 1012 performing the PDCCH monitoring with CORESETs such that: (a) a first CORESET is on a first carrier of the plurality of carriers; (b) a second CORESET is on a second carrier of the plurality of carriers; and (c) both the first CORESET and the second CORESET are on a third carrier of the plurality of carriers.

In some implementations, in performing the PDCCH monitoring, process 1100 may involve processor 1012 performing the PDCCH monitoring with multiple CORESETs linked to one cross-carrier search space set.

15                                                                                16

In some implementations, in performing the PDCCH monitoring, process 1100 may involve processor 1012 performing the PDCCH monitoring with a search space set. In such cases, a group of carriers of the plurality of carriers that is associated to the search space set may be included in a search space configuration.

In some implementations, in performing the PDCCH monitoring, process 1100 may involve processor 1012 performing the PDCCH monitoring with new ALs defined for use in a cross-carrier search space set. In such cases, support of the new ALs may be a UE capability reported to a network (e.g., network 120 via apparatus 1020 as network node 125).

In some implementations, in performing the PDCCH monitoring, process 1100 may involve processor 1012 performing the PDCCH monitoring with new information specifying a number of PDCCH candidates defined for a cross-carrier search space set. In such cases, support of the new information may be a UE capability reported to a network (e.g., network 120 via apparatus 1020 as network node 125).

In some implementations, in performing the PDCCH monitoring, process 1100 may involve processor 1012 performing the PDCCH monitoring with a common search space set either allowed or not allowed for a cross-carrier search space set such that: (a) the cross-carrier search space set is for a UE-specific search space set; or (b) the cross-carrier search space set is allowed for both the UE-specific search space set and the common search space set; or (c) the cross-carrier search space set is enabled or disabled separately for the UE-specific search space set and the common search space set.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "includ-ing" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
adjusting, by a processor of an apparatus implemented in a user equipment (UE), either or both of a control channel element (CCE) budget and a blind decoding (BD) budget to result in either or both of an adjusted CCE budget and an adjusted BD budget being allocated to a plurality of carriers; and performing, by the processor, physical downlink control channel (PDCCH) monitoring in the plurality of carriers using either or both of the adjusted CCE budget and the adjusted BD budget, wherein the CCE budget comprises an upper limit on a maximum number of CCEs that the UE is configured to perform per carrier of the plurality of carriers, and wherein the BD budget comprises an upper limit on a maximum number of BDs that the UE is configured to perform, wherein the adjusting of either or both of the CCE budget and the BD budget comprises:

re-scaling either or both of the CCE budget and the BD budget as a UE capability; and reporting support of the UE capability to a network.

2. The method of claim 1, wherein the adjusting of either or both of the CCE budget and the BD budget comprises redistributing either or both of the CCE budget and the BD budget evenly or unevenly among one or more downlink (DL) carriers of the plurality of carriers.

3. The method of claim 2, wherein a minimum number of carriers on which the CCE budget or the BD budget is redistributed is predefined or reported as a UE capability.

4. The method of claim 2, wherein a respective upper limit is defined for CCEs and BDs per carrier after the redistributing.

5. The method of claim 1, wherein the re-scaling of either or both of the CCE budget and the BD budget is enabled or disabled per cell group or per group of carriers of the plurality of carriers.

6. The method of claim 1, wherein the re-scaling of either or both of the CCE budget and the BD budget is associated to time-division duplexing (TDD) patterns on different carriers of the plurality of carriers.

7. The method of claim 1, wherein the re-scaling of either or both of the CCE budget and the BD budget is enabled or disabled based on whether or not there is high-priority traffic.

8. The method of claim 1, wherein the re-scaling of either or both of the CCE budget and the BD budget is enabled in an event that high-priority traffic is supported or a specific downlink control information (DCI) format is configured for monitoring.

9. The method of claim 1, wherein the re-scaling applies to either CCEs or BDs but not both and is separately enabled, disabled or configured for CCEs and BDs.

10. The method of claim 1, wherein the adjusting of either or both of the CCE budget and the BD budget comprises re-scaling either or both of the CCE budget either semi-statically by a radio resource control (RRC) signal from a network or dynamically by a downlink control information (DCI) signal from the network.

11. The method of claim 1, wherein each of the CCE budget and the BD budget is defined per cell group, and wherein different limits on the CCE budget and the BD budget are defined per cell group or per carrier.

12. The method of claim 11, wherein each of the CCE budget and the BD budget per cell group is supported as a UE capability which is enabled or disabled either semi-statically by a radio resource control (RRC) signal from a network or dynamically by a downlink control information (DCI) signal from the network.

13. The method of claim 1, wherein the performing of the PDCCH monitoring comprises performing the PDCCH monitoring with extra CCEs or BDs, or both, in cross-carrier search space sets with one or more of:

additional aggregation levels (ALs), a greater number of candidates per AL, and a greater number of downlink control information (DCI) sizes.

14. The method of claim 1, wherein the performing of the PDCCH monitoring comprises performing the PDCCH monitoring with control resource sets (CORESETs) such that:

a first CORESET is on a first carrier of the plurality of carriers;

a second CORESET is on a second carrier of the plurality of carriers; and both the first CORESET and the second CORESET are on a third carrier of the plurality of carriers.

15. The method of claim 1, wherein the performing of the PDCCH monitoring comprises performing the PDCCH monitoring with multiple control resource sets (CORESETs) linked to one cross-carrier search space set.

16. The method of claim 1, wherein the performing of the PDCCH monitoring comprises performing the PDCCH monitoring with a search space set, and wherein a group of carriers of the plurality of carriers that is associated to the search space set is included in a search space configuration.

17. The method of claim 1, wherein the performing of the PDCCH monitoring comprises performing the PDCCH monitoring with new aggregation levels (ALs) defined for use in a cross-carrier search space set, and wherein support of the new ALs is a UE capability reported to a network.

18. The method of claim 1, wherein the performing of the PDCCH monitoring comprises performing the PDCCH monitoring with new information specifying a number of PDCCH candidates defined for a cross-carrier search space set, and wherein support of the new information is a UE capability reported to a network.

19. The method of claim 1, wherein the performing of the PDCCH monitoring comprises performing the PDCCH monitoring with a common search space set either allowed or not allowed for a cross-carrier search space set such that:

the cross-carrier search space set is for a UE-specific search space set; or the cross-carrier search space set is allowed for both the UE-specific search space set and the common search space set; or the cross-carrier search space set is enabled or disabled separately for the UE-specific search space set and the common search space set.

* * * * *